(12) United States Patent
Beadle

(10) Patent No.: US 10,610,017 B2
(45) Date of Patent: Apr. 7, 2020

(54) SYSTEM, METHOD, AND APPARATUS FOR INSTALLING AND MODIFYING PALLET RACK BEAM SHELVING

(71) Applicant: Michael Paul Beadle, Denham Springs, LA (US)

(72) Inventor: Michael Paul Beadle, Denham Springs, LA (US)

( * ) Notice: Subject to any disclaimer, the term of this patent is extended or adjusted under 35 U.S.C. 154(b) by 84 days.

(21) Appl. No.: 15/816,493

(22) Filed: Nov. 17, 2017

(65) Prior Publication Data
US 2019/0150616 A1 May 23, 2019

(51) Int. Cl.
| | |
|---|---|
| *A47B 97/00* | (2006.01) |
| *A47B 57/34* | (2006.01) |
| *B65G 1/02* | (2006.01) |
| *A47B 47/02* | (2006.01) |
| *A47B 57/40* | (2006.01) |
| *A47B 57/48* | (2006.01) |
| *A47B 47/00* | (2006.01) |
| *A47B 57/50* | (2006.01) |

(52) U.S. Cl.
CPC .......... *A47B 97/00* (2013.01); *A47B 47/0058* (2013.01); *A47B 47/02* (2013.01); *A47B 57/34* (2013.01); *A47B 57/402* (2013.01); *A47B 57/485* (2013.01); *B65G 1/02* (2013.01); *A47B 57/50* (2013.01)

(58) Field of Classification Search
CPC ............ A47B 97/00; A47B 57/34; B65G 1/02
See application file for complete search history.

(56) References Cited

U.S. PATENT DOCUMENTS

2014/0138503 A1\* 5/2014 Consaul ................ A47B 97/00
248/214

\* cited by examiner

*Primary Examiner* — John C Hong
(74) *Attorney, Agent, or Firm* — Dunlap Bennett & Ludwig PLLC; Brendan E. Squire

(57) ABSTRACT

A system, method, and apparatus for installing or modifying the configuration of a pallet rack beam shelving system. A pallet rack assembly tool includes a mounting stub that is configured to be positioned below a cross member of a pallet rack system. A beam carrier is then operatively coupled to the mounting stub to place an upper support surface subjacent to a bottom edge of the cross member. The beam carrier includes upstanding beam stop extending forwardly from and above the upper support surface. The beam stop is configured to retain a released end of the cross member while the worker may attach or detach an opposite end of the cross member to or from the upright support member.

15 Claims, 4 Drawing Sheets

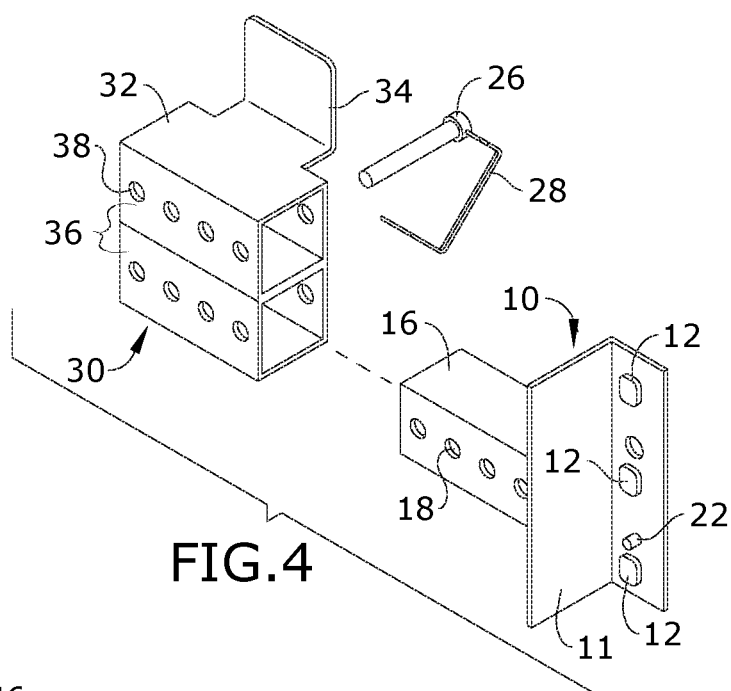
FIG.4
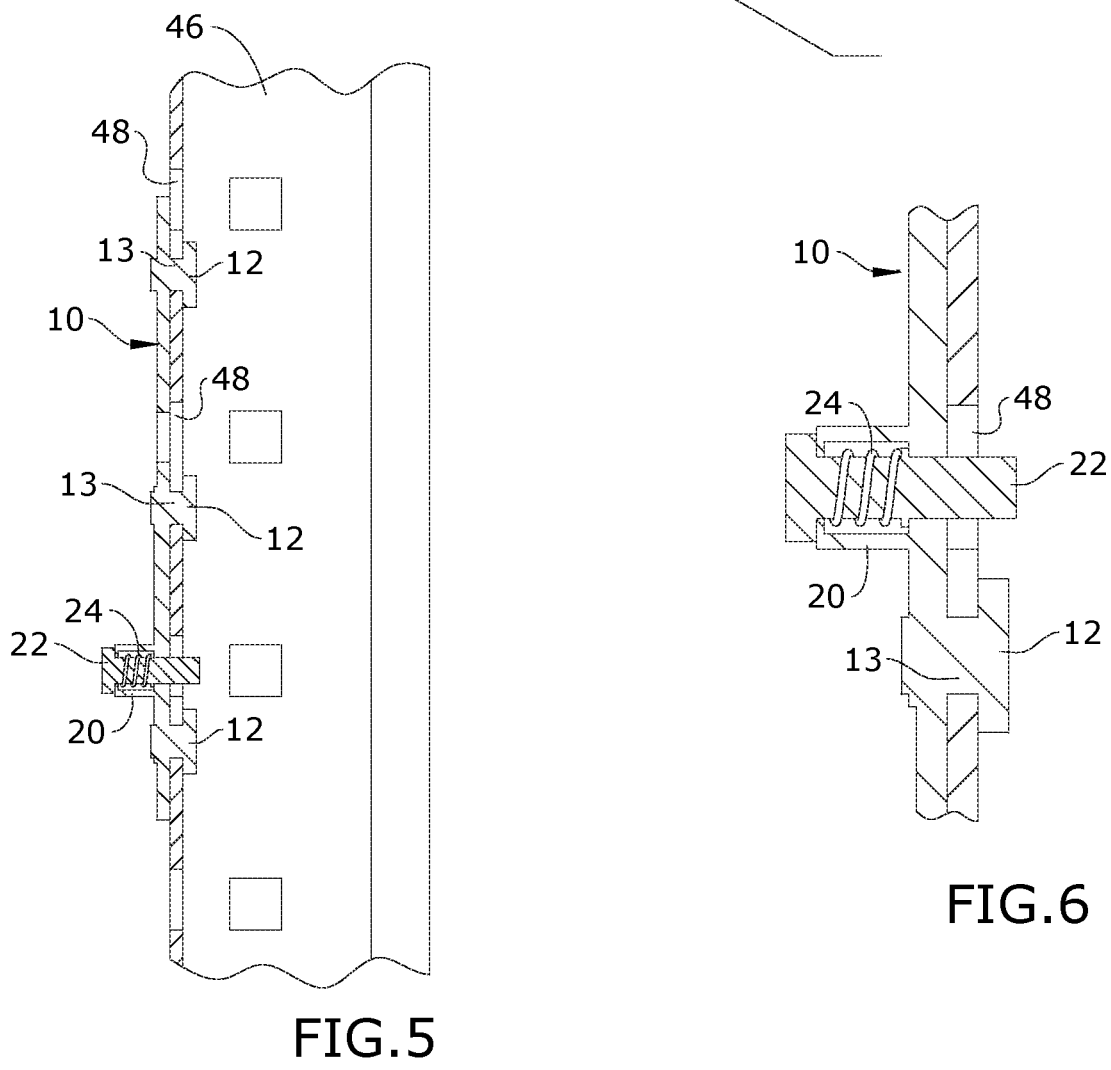
FIG.5
FIG.6

SYSTEM, METHOD, AND APPARATUS FOR INSTALLING AND MODIFYING PALLET RACK BEAM SHELVING

BACKGROUND OF THE INVENTION

The present invention relates to shelving structures and, more particularly, to heavy duty pallet rack beam shelving structures for warehouse and product display. Many building supply and other "big box" wholesale/retail businesses utilize pallet rack beam shelving systems for storing and, in many instances, displaying their inventory to customers.

The pallet rack beam shelving systems are formed from a plurality of beam cross members and upright members. To install, modify, remove, or replace the shelf beams currently requires two (2) personnel to complete the task. Even with two personnel, the holding of the beam by the other person, presents a potential safety risk that the other person may drop the cross beam while it is being repositioned for attachment to the upright member.

As can be seen, there is a need for an improved system, method and apparatus for installing and modifying pallet rack beam shelving.

SUMMARY OF THE INVENTION

In one aspect of the present invention, a tool for assembly of one or more cross members to an upright support member of a pallet rack shelving system, includes an attachment stub having a laterally outwardly facing L-shaped bracket and a plurality of attachment pins disposed in a spaced apart relation along an aft face of the L-shaped bracket. The plurality of attachment pins are configured for cooperative engagement with a plurality of keyed apertures defined in a front face of the upright support member. A mounting stub extends laterally inwardly from the L-shaped bracket. A beam carrier has an upper support surface and an upstanding beam stop extending forwardly from and above the upper support surface. At least one channel member is carried below the upper support surface. The channel member is configured to be telescopically received with the mounting stub. The tool may also include a spring biased locking pin configured to be releasably received in one of the plurality of keyed apertures. A plurality of holes may be defined in a spaced apart relation along a lateral length of the at least one channel member. A plurality of corresponding holes may be defined in a spaced apart relation along a lateral length of the mounting stub. A locking pin may be received through at least one of the plurality of holes and at least one of the plurality of corresponding holes when the channel member is telescopically received with the mounting stub.

Other aspects of the invention include a method for assembling a cross member to an upright support member of a pallet rack shelving system. The method includes attaching an attachment stub to a front face of the upright support member, the attachment stub having an laterally outwardly facing L-shaped bracket and a plurality of attachment pins disposed in a spaced apart relation along an aft face of the L-shaped bracket. The plurality of attachment pins are configured for cooperative engagement with a plurality of keyed apertures defined in a front face of the upright support member. A mounting stub extending laterally inwardly from the L-shaped bracket.

The method also includes attaching a beam carrier to the attachment stub. The beam carrier has an upper support surface and an upstanding beam stop extending forwardly from and above the upper support surface. At least one channel member is carried below the upper support surface, wherein the channel member is telescopically received with the mounting stub.

A locking pin may be inserted through one of a plurality of a plurality of holes defined in a spaced apart relation along a lateral length of the at least one channel member and one of a plurality of corresponding holes defined in a spaced apart relation along a lateral length of the mounting stub. A first end of one of the cross member may then be detached from the upright support member and supported on the beam carrier. A second end of the cross member may then be detached from the upright support member.

The method may also include repositioning the attachment stub and the beam carrier on the upright support member. A first end of the cross member may then be placed on the repositioned beam carrier.

In other aspects of the method, a left hand attachment stub is attached to a left upright support member and a right hand attachment stub is attached to a right upright support member. A beam carrier is attached to each of the left hand attachment stub and the right hand attachment stub. The cross member may then be supported on the left and the right beam carrier. A first end of the cross member may then be attached to the upright support member. Next, a second end of the cross member may then be attached to the upright support member.

These and other features, aspects and advantages of the present invention will become better understood with reference to the following drawings, description and claims.

BRIEF DESCRIPTION OF THE DRAWINGS

FIG. 4 is an rear exploded view of the invention;

FIG. 5 is a section view of the invention, taken along line 5-5 in FIG. 1;

FIG. 6 is a detail section view of the invention;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1:
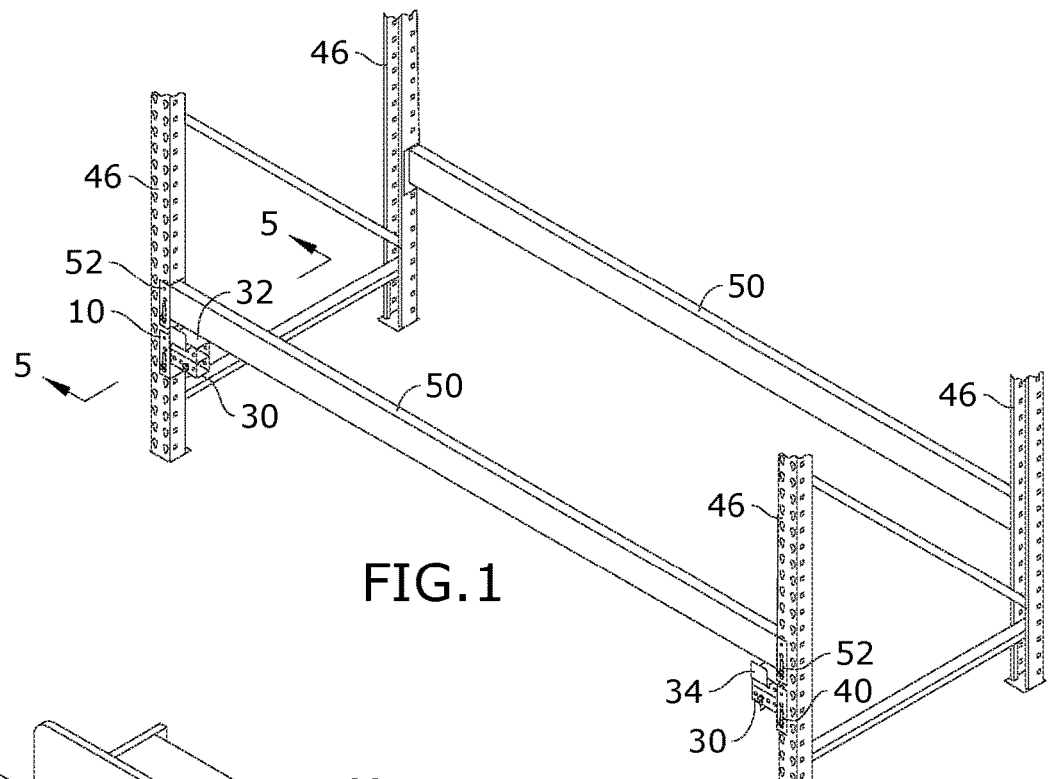
FIG. 1 is a perspective view of the invention, shown in use.
Figure 2:
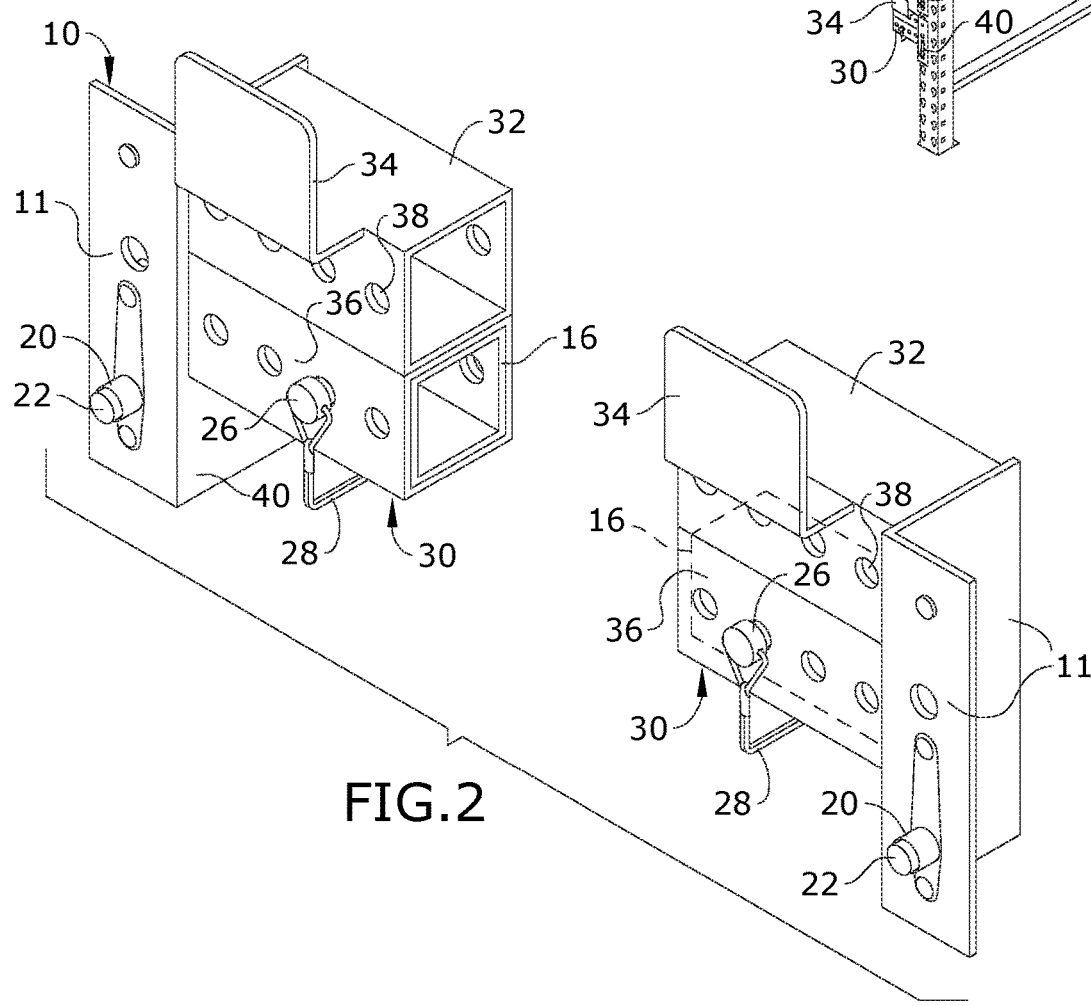
FIG. 2 is a perspective view of the invention.

Broadly, an embodiment of the present invention provides an improved system, method, and apparatus for installing or modifying the configuration of a pallet rack beam shelving system. As seen in reference to FIG. 1, a typical pallet rack beam shelving unit includes a plurality of upright support members (46). The upright support members (46) include a plurality of keyed apertures (48) disposed in a spaced apart relation along a face of the upright support member (46). Typically, the keyed apertures (48) are disposed in two columns with horizontally-aligned pairs of keyed apertures (48).

A plurality of cross beams (50) include a mounting bracket (52) disposed at the first and second ends of the cross beam (50). The mounting bracket (52) includes a plurality of mounting pins (54) that protrude from an inboard face of the bracket (52). The mounting pins (54) have a head portion and a connecting shaft portion. The head portion is configured to be received within a top portion of the keyed aperture (48) while being larger than the bottom portion of the keyed aperture (48). The shaft portion is configured to be received within the bottom portion of the keyed aperture (48). With the shaft received in the bottom portion of keyed aperture (48), the head portion retains the cross beam (50) to the upright member. The bracket (52) may also carry a spring biased lock pin to retain the bracket (52) in cooperative engagement with the keyed apertures (48). Once a front and a rear cross member (50) is installed, shipping pallets or other planking support are then carried by the front and rear cross members (50).

Due to the length and weight of the cross beams (50), one person will carry a first end of the cross member (50) while a second person carries the second end of the cross member (50) when the pallet rack structure is being constructed or reconfigured.

A pallet rack assembly tool, according to aspects of the present invention, is shown in reference to FIGS. 2-6. A left and a right rack assembly tool may be formed as mirror images of each other.

The pallet rack assembly tool includes an attachment stub (10) and a beam carrier (30). The attachment stub (10) is similar to the bracket (52) of the cross member (50). The attachment stub (10) includes an L-shaped bracket (11) and a plurality of attachment pins disposed in a spaced-apart relation along an inward face of the L-shaped bracket (11). The attachment pins have a head portion (12) and a shaft portion (13). The head portion (12) is configured to be received in the keyed apertures (48) and retain the attachment stub (10) to the upright member (50). The attachment stub (10) may also include a spring biased locking pin (22) that is biased by a spring (24) and carried in a locking pin receiver 20. The locking pin (22) is also configured to be received in the keyed apertures (48) so that the attachment stub (10) may be locked to the upright member (50). The attachment stub (10) is also configured with a mounting stub (16) that extends from an inner face 40 of the L-shaped bracket (11). The mounting stub (16) is configured to telescopically join with a beam carrier (30).

The beam carrier (30) includes an upper support surface (32) and an upstanding beam stop (34) extending outwardly from and above the upper support surface (32). At least one channel member (36) is carried below the upper support surface (32) and is configured to telescopically join with the mounting stub (16). The channel member (36) has a plurality of spaced apart holes (38) configured to align with a corresponding plurality of spaced apart holes (18) defined in the mounting stub (16). A locking pin (26) and keeper (28) may be received through the holes (38) and the corresponding holes (18) to secure the beam carrier to the attachment stub (10).

Preferably, the pallet rack assembly tool is formed as a two part construction to permit the placement of the support surface (32) subjacent to a bottom surface of an installed cross member (50). The beam carrier (30) may be formed so that it may be cooperatively received with either, or both, of a left or a right attachment stub (10).

Figure 3:
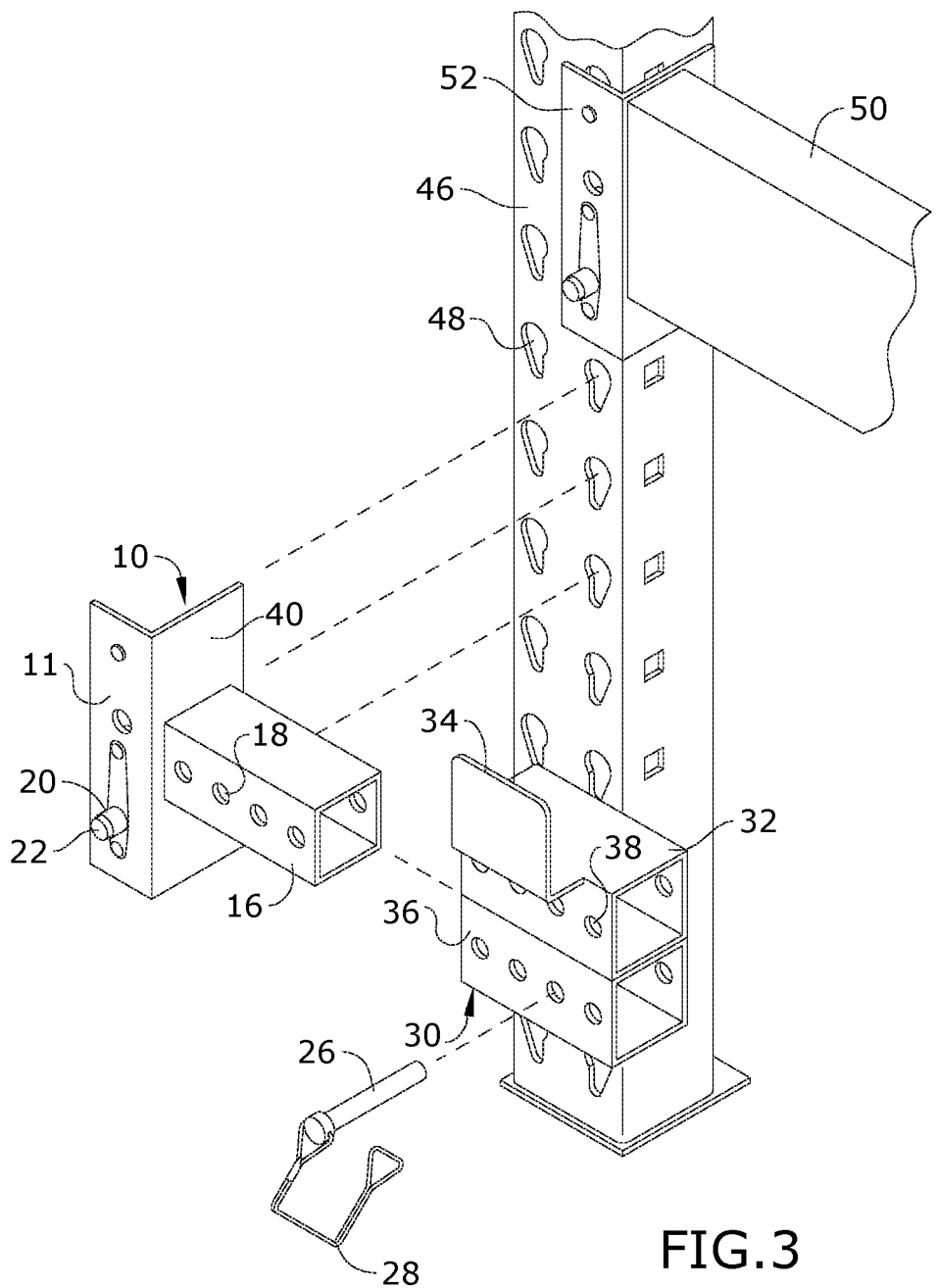
FIG. 3 is a front exploded view of the invention, illustrating the installation onto upright 46.
Figure 7:
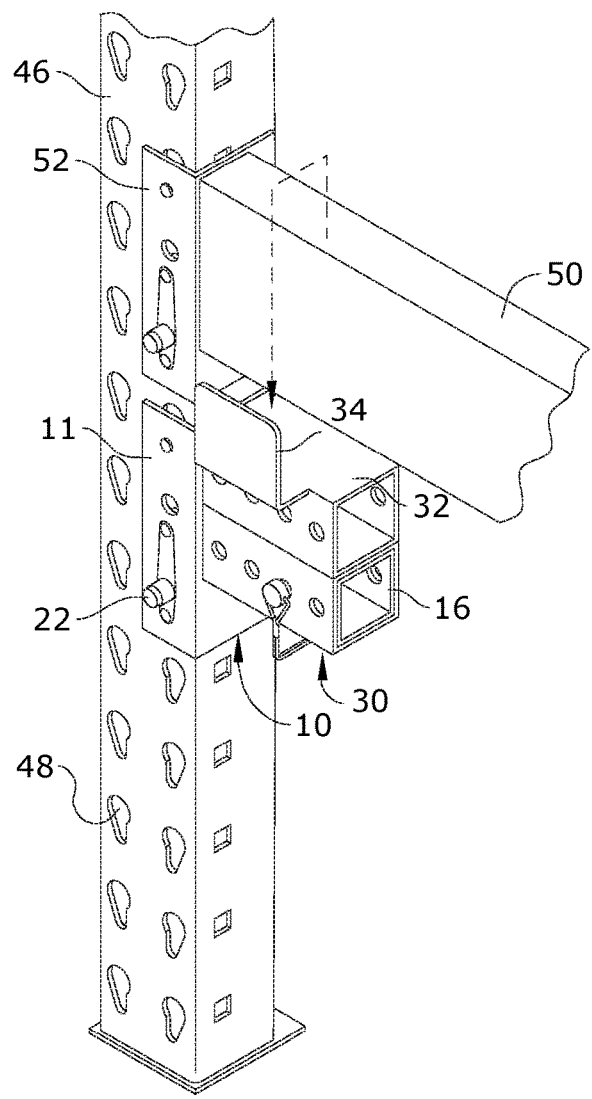
FIG. 7 is a detail perspective view of the invention, illustrating the removal of beam 50 from upright 46.
Figure 8:
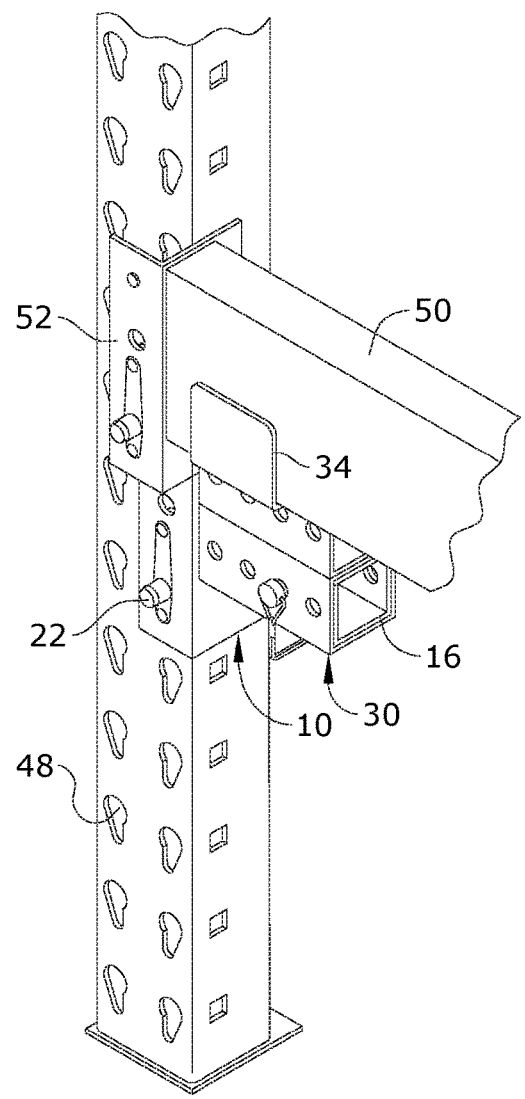
FIG. 8 is a detail perspective view of the invention, illustrating the placement of beam 50 into brace 34.

As shown in reference to FIGS. 3, 7 and 8, use the pallet rack assembly tool is described with respect to use in removing or repositioning an existing cross member (50).

The attachment stub (10) is secured to the upright support members (46) to the plurality of keyed apertures (48) located directly below the bracket (52) of installed cross member (52). Once the attachment stub (10) is seated in the keyed apertures (48), the locking pin (22) may be secured. The beam carrier (3)0 may then be attached to the support stub (16) so that the beam stop (34) is positioned outwardly from the upright support member (46) and the cross member (50). Once positioned, the holes (38) are aligned with the corresponding locking holes (18) and the locking pin (26) may then be inserted in the holes (18, 38) to secure the beam carrier (30) to the attachment stub (10). Depending on the work performed on the pallet rack system (installation, disassembly, or reconfiguration) a second pallet rack assembly tool may be installed to an opposite end of the cross member (50).

Once secured, the bracket (52) of the existing cross member (50) may then be disconnected from the upright member (46) by lifting vertically to disengage the retaining pins (54) from the keyed apertures (48) of the upright member (46). Once the retaining pins (54) are disengaged from the upright member (46), the cross member (50) may be placed and supported on the upper support surface (32) and moved outwardly to be placed in abutment with the beam stop (34). With the cross member (50) carried on the pallet rack assembly tool, the worker may then move to the opposite end of the cross member (50) and disengage the opposite end of the cross member (50). The cross member (50) may then be removed from or repositioned within the pallet rack structure.

As will be appreciated, the pallet rack assembly tool allows one person to perform the above-mentioned task. The pallet rack assembly tool may also be employed as a left-handed tool and a right-handed tool. A left-hand attachment stub (10) may be snapped into the left upright member (46) below the existing cross member (50). The beam carrier (30) may be slipped onto the left-hand attachment stub (10). A right-hand attachment stub (10) may then be applied to the right upright member (46) and the beam carrier (30) is attached to the right-hand attachment stub (10). This completes the support of the existing beam (50). At this time, the ends of the existing cross member (50) maybe unlocked and uncoupled from the upright and the cross member (50) and safely supported on the beam carrier (30), thereby allowing removal of the cross member (50) by one person. Thus, eliminating one person/worker and saving the company money (in the form of time, salary/wages, safety risks, liability, etc.).

It should be understood, of course, that the foregoing relates to exemplary embodiments of the invention and that modifications may be made without departing from the spirit and scope of the invention as set forth in the following claims.

What is claimed is:

1. A tool for assembly of one or more cross members to an upright support member of a pallet rack shelving system, comprising:
   an attachment stub having an laterally outwardly facing L-shaped bracket and a plurality of attachment pins disposed in a spaced apart relation along an aft face of the L-shaped bracket, the plurality of attachment pins configured for cooperative engagement with a plurality of keyed apertures defined in an front face of the upright support member,
   a mounting stub extending laterally inwardly from the L-shaped bracket;

a beam carrier having an upper support surface and an upstanding beam stop extending forwardly from and above the upper support surface, and at least one channel member carried below the upper support surface, wherein the channel member is configured to be telescopically received with the mounting stub.

2. The tool of claim 1, further comprising:

a spring biased locking pin configured to be releasably received in one of the plurality of keyed apertures.

3. The tool of claim 1, further comprising:

a plurality of holes defined in a spaced apart relation along a lateral length of the at least one channel member;

a plurality of corresponding holes defined in a spaced apart relation along a lateral length of the mounting stub; and a locking pin received through at least one of the plurality of holes and at least one of the plurality of corresponding holes when the channel member is telescopically received with the mounting stub.

4. A method for assembly of a cross member to an upright support member of a pallet rack shelving system, comprising:

attaching an attachment stub to a front face of the upright support member, the attachment stub having an laterally outwardly facing L-shaped bracket and a plurality of attachment pins disposed in a spaced apart relation along an aft face of the L-shaped bracket, the plurality of attachment pins configured for cooperative engagement with a plurality of keyed apertures defined in an front face of the upright support member, and a mounting stub extending laterally inwardly from the L-shaped bracket.

5. The method of claim 4, further comprising:

attaching a beam carrier to the attachment stub, the beam carrier having an upper support surface and an upstanding beam stop extending forwardly from and above the upper support surface, and at least one channel member carried below the upper support surface, wherein the channel member is telescopically received with the mounting stub.

6. The method of claim 5, further comprising:

inserting a locking pin through one of a plurality of holes defined in a spaced apart relation along a lateral length of the at least one channel member, and one of a plurality of corresponding holes defined in a spaced apart relation along a lateral length of the mounting stub.

7. The method of claim 5, further comprising:

detaching a first end one of the cross member from the upright support member; and supporting the first end on the beam carrier.

8. The method of claim 7, further comprising:

detaching a second end of the cross member from the upright support member.

9. The method of claim 8, further comprising:

repositioning the attachment stub on the upright support member.

10. The method of claim 9, further comprising:

placing a first end of the cross member on the on the beam carrier.

11. The method of claim 5, further comprising attaching a left-hand attachment stub to a left upright support member; and attaching a right-hand attachment stub to a right upright support member.

12. The method of claim 11, further comprising:

attaching a beam carrier to each of the left-hand attachment stub and the right-hand attachment stub.

13. The method of claim 12, further comprising:

supporting a cross member on the beam carrier.

14. The method of claim 13, further comprising:

attaching a first end of the cross member to the upright support member.

15. The method of claim 13, further comprising:

attaching a second end of the cross member to the upright support member.

\* \* \* \* \*